US008036661B2

(12) United States Patent
Vitorino (10) Patent No.: US 8,036,661 B2
(45) Date of Patent: Oct. 11, 2011

(54) METHOD AND SYSTEM FOR HANDLING A FAULTY REGISTRATION FOR A MOBILE COMMUNICATIONS DEVICE

(75) Inventor: Diana Vitorino, Toronto (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/647,124

(22) Filed: Dec. 24, 2009

(65) Prior Publication Data

US 2010/0159926 A1    Jun. 24, 2010

Related U.S. Application Data

(63) Continuation of application No. 11/509,570, filed on Aug. 25, 2006, now Pat. No. 7,668,544.

(51) Int. Cl.
*H04W 8/02* (2009.01)

(52) U.S. Cl. .................................. 455/435.1; 455/410

(58) Field of Classification Search ................ 455/435.1
See application file for complete search history.

(56) References Cited

U.S. PATENT DOCUMENTS

| 5,077,790 A | 12/1991 | D'Amico et al. |
| 5,448,760 A * | 9/1995 | Frederick ...................... 455/410 |
| 5,555,551 A * | 9/1996 | Rudokas et al. .............. 455/410 |
| 6,731,934 B1 | 5/2004 | Mills et al. |
| 6,760,585 B1 | 7/2004 | Stumer |
| 2002/0188562 A1 | 12/2002 | Igarashi et al. |
| 2004/0098515 A1 | 5/2004 | Rezvani |
| 2004/0192251 A1* | 9/2004 | Zhao et al. .................. 455/404.1 |
| 2005/0113091 A1 | 5/2005 | Rodriguez |
| 2006/0172732 A1 | 8/2006 | Nylander et al. |

* cited by examiner

*Primary Examiner* — Dwayne Bost
*Assistant Examiner* — Joseph Dean, Jr.
(74) *Attorney, Agent, or Firm* — William Vass; Bennett Jones LLP (57) ABSTRACT

A method and system for handling a faulty registration for a subscriber with a mobile communication device in a communications network. A faulty registration comprises a registration missing identification information or having a field that is missing an identifier or other form of information. The method and system comprise selecting another field or property in the faulty registration, which is populated with an identifier or identification information, and searching the selected field or property in a list of registrations for matching identification information. Associating the faulty registration with an existing registration for a subscriber based on matching the identification information. According to another aspect, the system and method comprise generating a new registration for the customer with the faulty registration if a matching registration is not located or search criteria are not satisfied. According to another aspect, the system and method comprise creating a record associated with the faulty registration.

20 Claims, 5 Drawing Sheets

FIG. 3(iii)

METHOD AND SYSTEM FOR HANDLING A FAULTY REGISTRATION FOR A MOBILE COMMUNICATIONS DEVICE

FIELD

The present invention relates to wireless packet data service networks, and more particularly, to a method and system for handling a faulty registration for a mobile communication device in a wireless packet data service network.

BACKGROUND

The use of mobile communication devices continues to grow, and so does the array of services offered by service providers and carriers. Service providers are able to provide users, i.e. subscribers, with both voice and data communication services. Data services for mobile communication devices typically utilize wireless packet data service networks for the data transfer sessions.

In order to use their mobile communications device, e.g. voice and/or data communications, a subscriber needs to "sign-on" with a carrier or service provider. A network relay interfaces the carrier or service provider with the enterprise or corporate network associated with the subscriber. The sign-on or activation process involves creating a registration for the mobile communications device in the network relay, for example, a provisioning system at the relay. Registration involves creating a SIM (Subscriber Identification Module) and a billing contract for the subscriber in the provisioning system. The carrier then activates the subscriber using a billing identifier (BID).

If the registration is faulty, then billing problems can arise. One such scenario occurs when the registration for the mobile communications device on the provisioning system for a network relay is missing or includes subscriber information which differs from the subscriber's billing information with the carrier or service provider. This leads to double billing scenarios between the network provisioning system and the carrier, which is clearly undesirable. Accordingly, there remains a need for improvements in the art.

BRIEF DESCRIPTION OF THE DRAWINGS

Reference will now be made to the accompanying drawings which show, by way of example, embodiments of the present invention, and in which.

Like reference numerals indicate like or corresponding elements in the drawings.

DETAILED DESCRIPTION OF THE EMBODIMENTS

This disclosure concerns a system and method for handling a faulty registration for a mobile communication device in a communications network.

According to one aspect, there is provided a method for handling a faulty registration for a subscriber of a mobile communications device in a provisioning system and the provisioning system includes a list of registrations for mobile communications device subscribers, the method comprises the steps of: receiving a faulty registration for the subscriber, wherein the faulty registration is missing information; selecting an existing field populated with identification information in the faulty registration; searching the list of registrations based on the identification information; associating the faulty registration with a registration retrieved from the list of registrations having matching identification information; utilizing the retrieved registration for identifying the subscriber with the mobile communications device.

According to another aspect, there is provided a system for handling a faulty registration for a subscriber in a communications network, the system comprises: means for receiving the faulty registration, wherein the faulty registration includes a field with missing identification information; provisioning means for provisioning a plurality of subscribers and including a list of registrations associated with the plurality of subscribers; means for selecting another field from the faulty registration wherein the selected field is populated with other identification information; means for searching the selected field in the registration in the list of registrations; means for associating the faulty registration with a registration retrieved from the list of registrations having matching identification information; and the means for provisioning processing the subscriber associated with the faulty registration based on the retrieved registration.

According to another aspect, there is provided a computer program product for handling a faulty registration for a subscriber of a mobile communications device in a provisioning system and the provisioning system includes a list of registrations for mobile communications device subscribers, the computer program product comprises: a medium for storing computer-readable instructions; and the computer-readable instructions include, receiving a faulty registration for the subscriber, wherein the faulty registration is missing an information field; selecting an existing field populated with identification information in the faulty registration; searching the list of registrations based on the identification information; associating the faulty registration with a registration retrieved from the list of registrations having matching identification information; provisioning the subscriber utilizing the retrieved registration.

Figure 1:
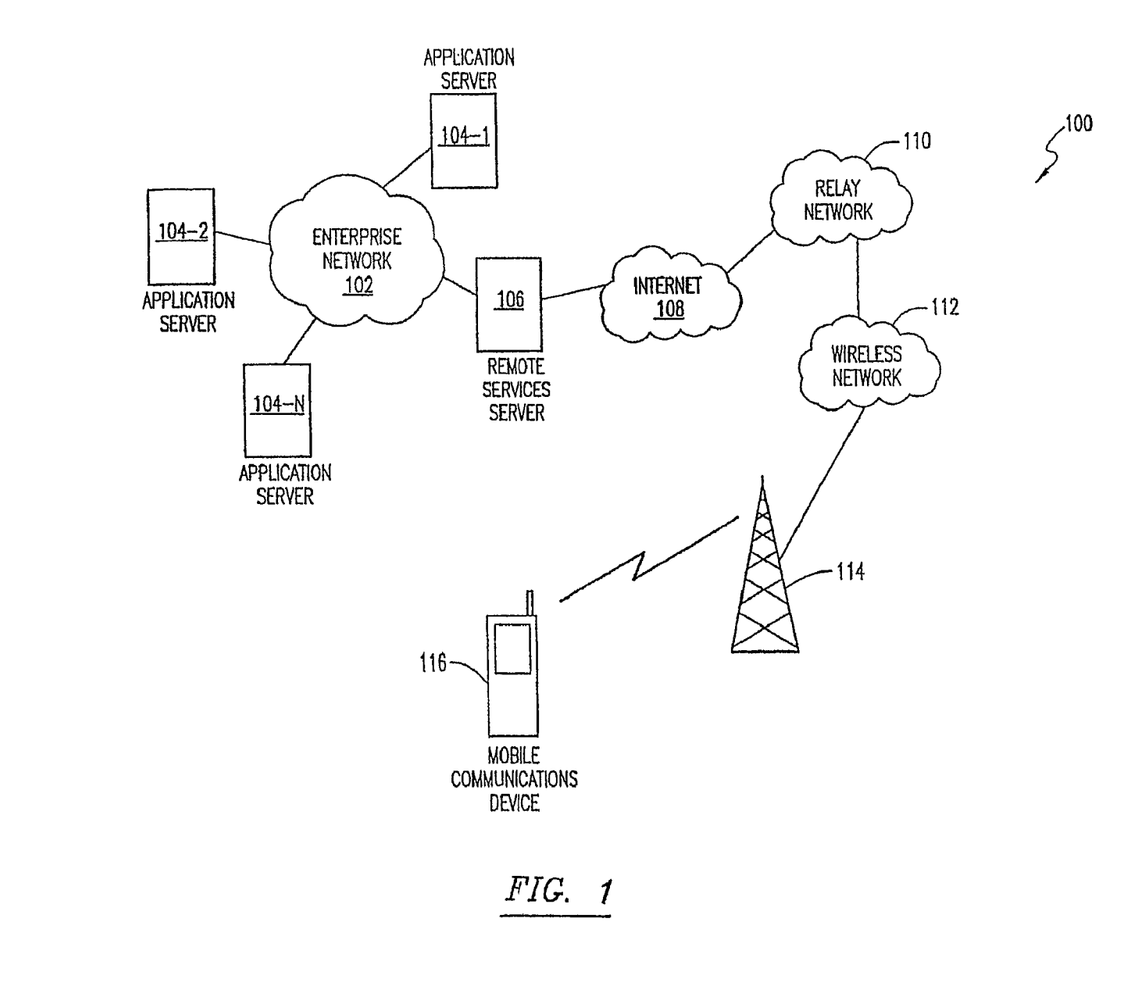
FIG. 1 shows in diagrammatic form an exemplary network environment including a wireless packet data service network suitable for operating an embodiment according to the present application.

Reference is made to FIG. 1, which shows in diagrammatic form an exemplary network environment or communications network 100 including a wireless packet data service network 112 wherein an embodiment as described herein may be practiced. An enterprise network 102, which may be a packet-switched network, can include one or more geographic sites and be organized, for example, as a local area network (LAN), wide area network (WAN) or a metropolitan area network (MAN), for serving a plurality of users. A number of application servers 104-1 through 104-N disposed as part of the enterprise network 102 are operable to provide or effectuate a host of internal and external services such as email, video mail, Internet access, corporate data access, messaging, calendaring and scheduling, information management and the like. Accordingly, a diverse array of personal information devices or appliances, 104-i, where i=1, 2, . . . , N, with respect to the services supported in the enterprise network 102.

Additionally, a remote services server 106 may be interfaced with the enterprise network 102 for enabling a user, for example a corporate user, to access or effectuate any of the services from a remote location using a suitable mobile communications device (MCD) 116. A secure communication link with end-to-end encryption may be established that is mediated through an external IP network, e.g. a public packet-switched network such as the Internet 108, as well as the wireless packet data service network 112 operable with the mobile communications device 116 via a suitable wireless network infrastructure that includes a base station (BS) 114. In one embodiment, a trusted relay network 110 may be disposed between the Internet 108 and the infrastructure of wireless packet data service network 112. In another embodiment, the infrastructure of the trusted relay network 110 may be integrated with the wireless packet data service network 112, whereby the functionality of the relay infrastructure, certain aspects of which will be described in greater detail below, is consolidated as a separate layer within a "one-network" environment. Additionally, by way of example, the MCD 116 may be a data-enabled mobile handheld device capable of receiving and sending messages, web browsing, interfacing with corporate application servers, etc., regardless of the relationship between the networks 110 and 112. Accordingly, a "network node" may include both relay functionality and wireless network infrastructure functionality in some exemplary implementations.

For purposes of the present discussion, the wireless packet data service network 112 may be implemented in any known or heretofore unknown mobile communications technologies and network protocols, as long as a packet-switched data service is available therein for transmitting packetized information. For example, the wireless packet data service network 112 may comprise a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (DEN), a Code Division Multiple Access (CDMA) network, a Universal Mobile Telecommunications System (UMTS) network, or any $3^{rd}$ Generation (3G) network.

Figure 2:
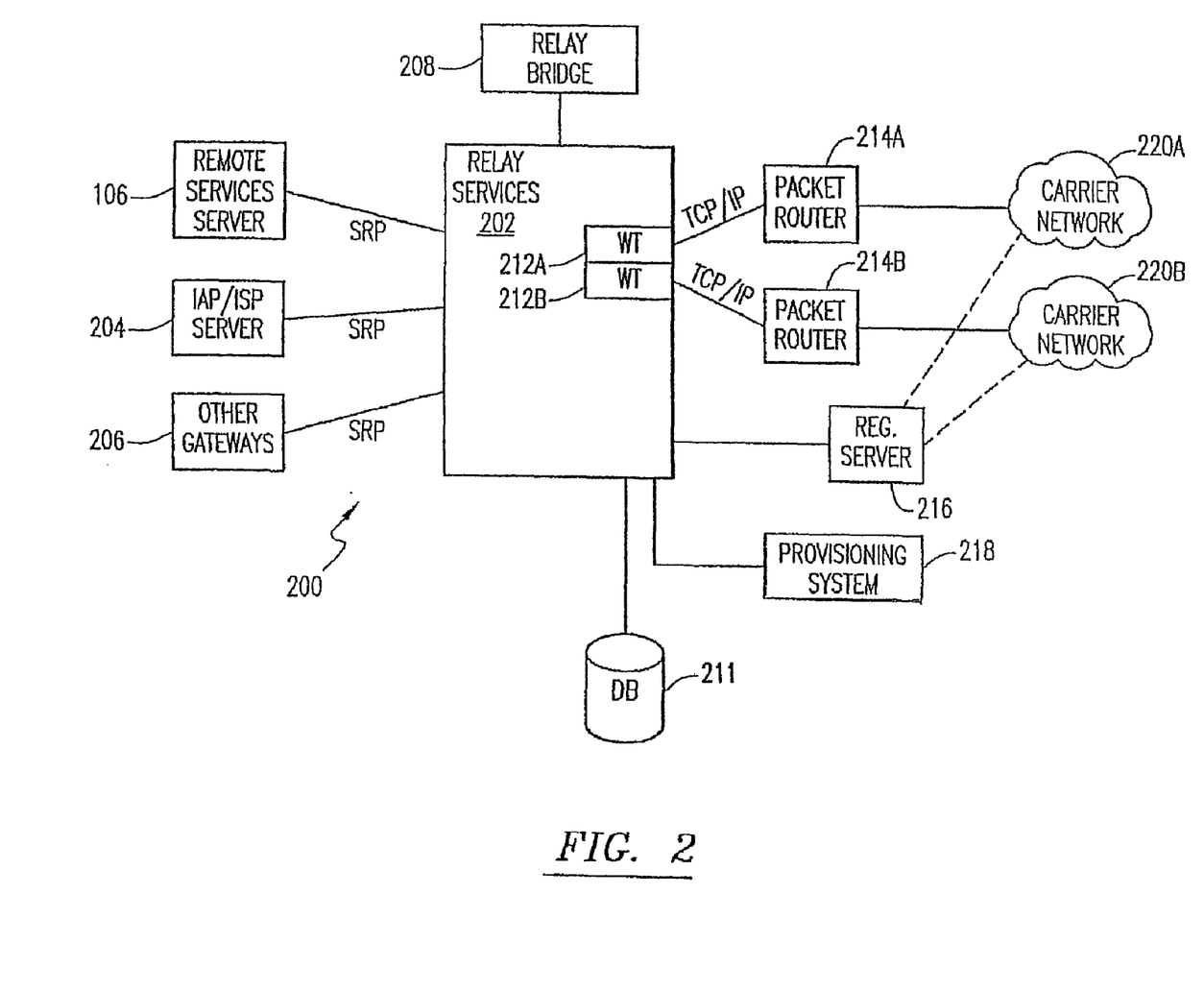
FIG. 2 shows in diagrammatic form additional details of an exemplary relay network for operating a mobile communications device in accordance with an embodiment.

Reference is next made to FIG. 2, which shows additional details of an exemplary relay network infrastructure, indicated generally by reference 200, operable as part of the relay network 110 (FIG. 1) interfacing with the wireless packet data service network 112 described above. A relay service node 202 is operable, at least in part, for providing connectivity between the MCDs 116 and various data application services, for example, enterprise services, external IP data services, regardless of the geographic location of the MCDs 116 and their respective wireless carriers. Also, since multiple relay services nodes can co-exist in a distributed network architecture, a relay bridge 208 may be provided in operable connection with the relay services node 202 for supporting inter-relay connectivity. In one implementation, the relay bridge 208 connects with separate relay node sites, forming tunnels between relays over which messages from the MCD 116 can flow to and from services, irrespective of the region where the MCD 116 is located.

Communication between the relay services node 202 and various application gateways and servers is effectuated using any suitable protocol, for example, Server Relay Protocol (SRP), over IP links. By way of example, the remote services server 106 (FIG. 1) associated with the enterprise network 102 (shown in FIG. 1) communicates with the relay using SRP for effectuating internal data services with respect to the enterprise's mobile subscribers. Likewise, reference numerals 204 and 206 refer to external application gateways, such as Internet Service Provider (ISP) or Internet Access Provider (IAP) servers, and other gateways, respectively, which are also interfaced with the relay node 202 using SRP.

Additionally, a database 211 may be provided in operable connection with the relay node 202 for handling and managing location information for the mobile communications devices (MCDs) 116 (FIG. 1). As shown in FIG. 2, the relay network 200 includes a registration server 216. The registration server 216 handles administration and registration services for the mobile communication devices, and is operable for providing registration services for MCDs when they are initially activated or when the user re-registers, for example, due to moving to a different wireless network coverage area. In one implementation, the location information from the registration server 216 may be programmed into a MCD. When the MCD registers successfully, the registration server 216 is operable to provide the serving relay node's location, whereupon data sessions may be engaged by the MCD.

One or more wireless transport (WT) interfaces are provided as part of relay services node 202 for connecting with wireless carrier networks that provide subscription services to the MCDs, for example, voice and/or data transfer services. By way of example, WT 212A and 212B communicate with respective packet routers 214A and 214B using TCP/IP links, which route data packets to and from respective wireless packet data service networks, exemplified in FIG. 2 as carrier network 220A and carrier network 220B. The registration server 216 may be provided with separate WT and packet routing for interfacing and facilitating communications with the carrier networks 220A, 220B.

Referring again to FIG. 2, the relay network 200 includes a provisioning module or system (PRV) 218. The provisioning system 218 is co-located or otherwise associated with the relay services node 202 and is operable for setting up and managing various service providers (i.e. carrier networks), subscribers, MCD manufacturers, resellers, and other entities in order to support any number of service and market differentiation requirements. According to an embodiment, the faulty registration management mechanism is implemented in the provisioning system 218 as described in more detail below. The provisioning system 218 may be implemented with a plurality of interfaces for the various interfaces to registration servers, peer-to-peer servers, location databases, etc.

It will be appreciated by one skilled in the art that the various databases, service logic processing, and the faulty registration processing set forth may be realized in suitable hardware, firmware/software and/or firmware/software logic blocks, modules or components or in combination thereof. Furthermore, the functionality of the relay network may also be integrated within a wireless carrier network, whereby a "network node" may generally comprise the relay layer functionality as well.

Figure 3:
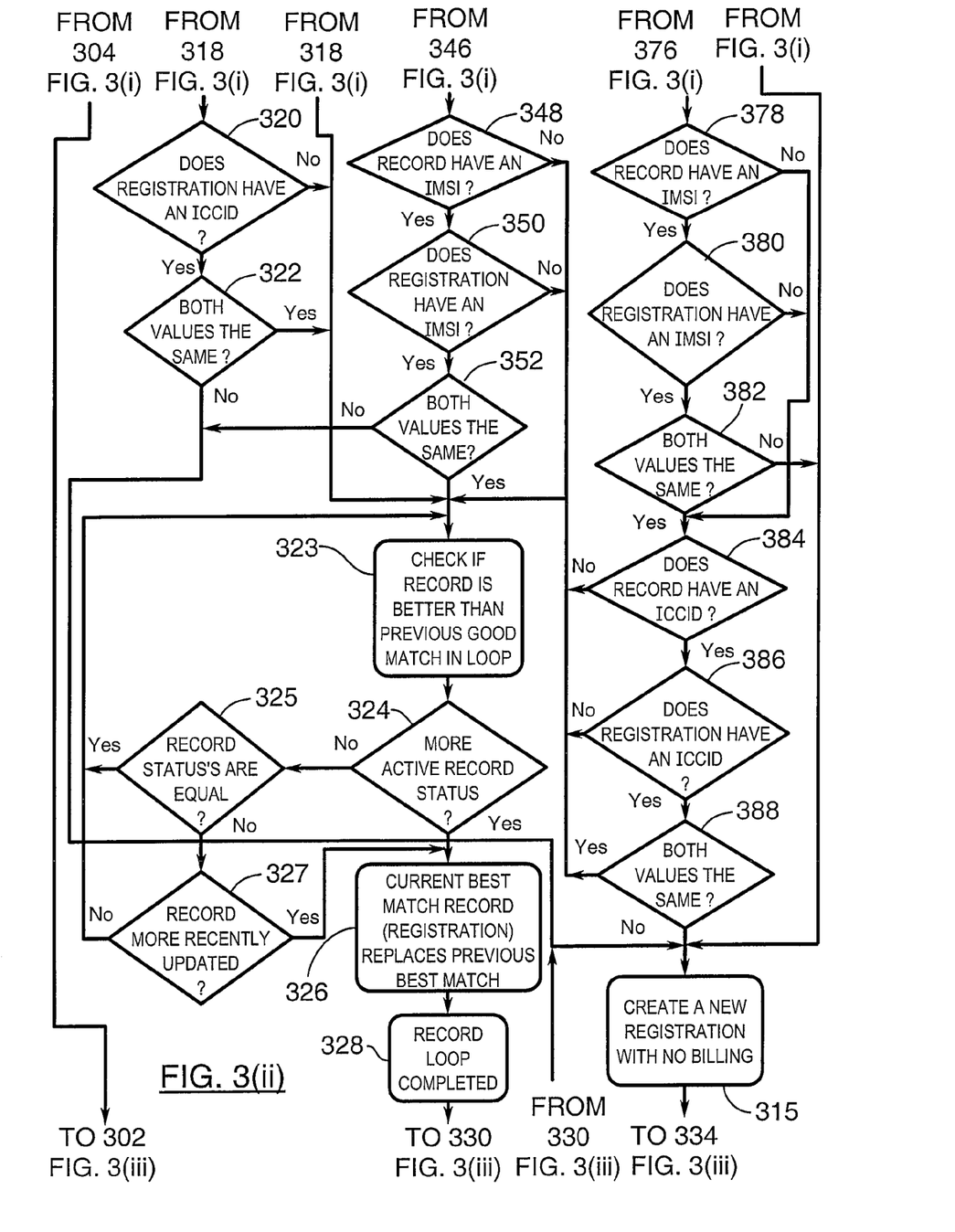
FIG. 3 shows in flowchart form a process for handling a faulty registration for a mobile communication device in a communications network according to an embodiment.
Figure 3I:
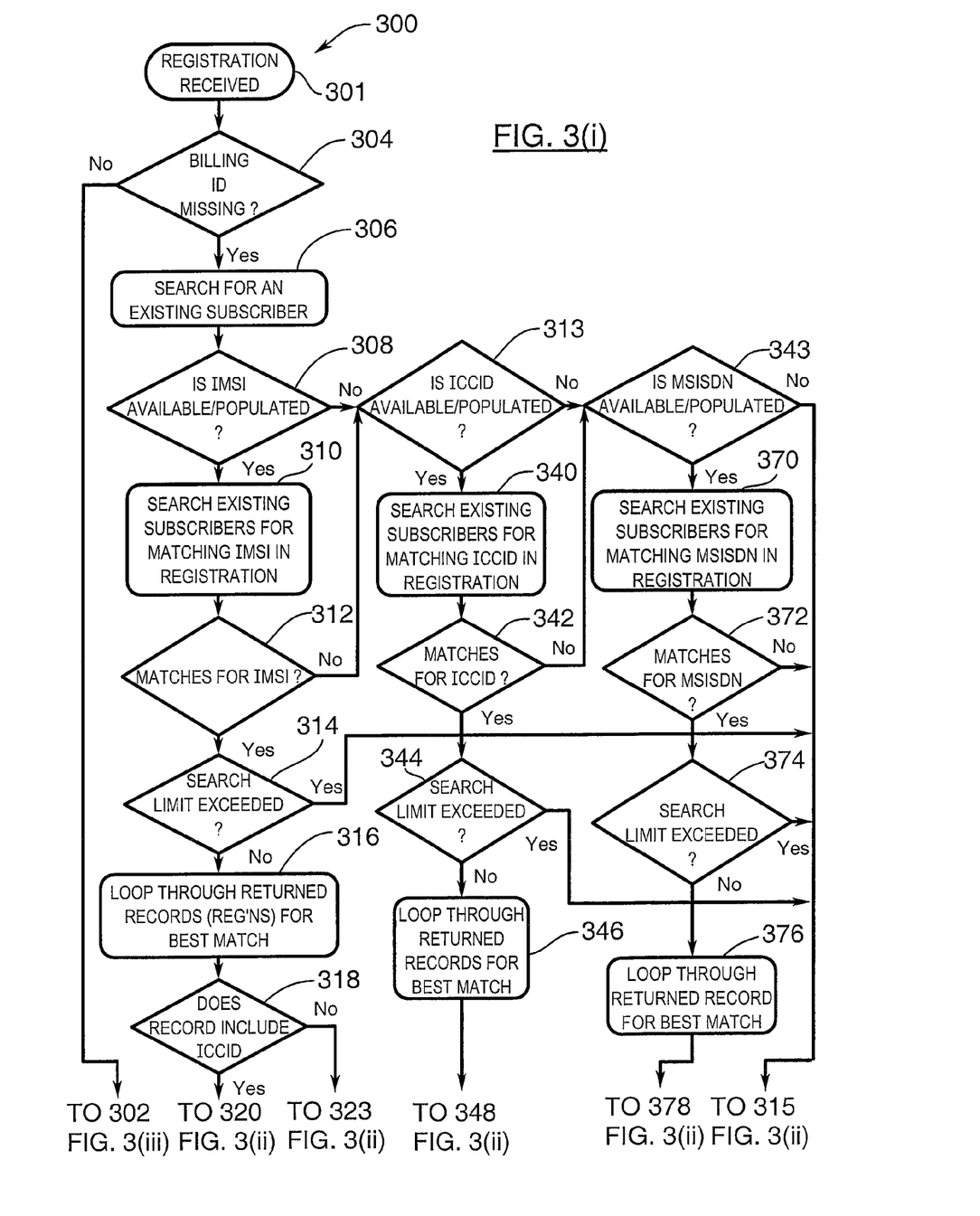

Reference is next made to FIG. 3, which shows in flowchart form a process for handling a faulty registration for a subscriber and indicated generally by reference 300 according to an embodiment. According to this embodiment, a faulty registration occurs, for example, if the registration is missing a SIM attribute that is associated with the subscriber's billing identifier (BID) in the carrier.

As shown in FIG. 3, the first step in the faulty registration handling or management process 300 comprises receiving a registration 301 and next identifying faulty registration in 304. In this embodiment, a faulty registration comprises a registration that is missing billing identification information in the billing identifier (BID) field. It will however be appreciated that a faulty registration may comprise registrations which are missing other types of information or properties. The provisioning system or module 218 (FIG. 2) receives a registration for a customer from a carrier and processes, i.e. reviews, the registration for the Billing ID or BID. If the Billing ID is missing from the registration in 304, the faulty registration management process 300 attempts to identify an existing Subscriber in the provisioning system 218 (FIG. 2) using another piece or type of information, property, or a field in the SIM (Subscriber Identity Module). This involves searching a list of registrations in the provisioning system 218 (FIG. 2) in 306 and selecting/identifying an existing subscriber having a registration which best matches the faulty registration received in step 301 and proceeding with provisioning, as will be described in more detail below. If the registration is not faulty, i.e. the Billing ID or information from some other field or property is not missing, then the provisioning process continues as indicated by 302.

According to one embodiment, if the IMSI (International Mobile Subscriber Identity) field is populated in the registration as indicated by 308, the searching process comprises searching the list of registrations for the IMSI indicated by 310, as will be described in more detail below. If the IMSI field is not populated or otherwise not available, then the process comprises searching the list the registrations for another field or property as described in more detail below. According to one embodiment, if the ICCID/SIMID (Integrated Circuit Card Identifier/Subscriber Identity Module Identifier) field is populated as indicated by 313, then the searching process comprises searching the ICCID/SIMID field in the list of registrations 340 as will be described in more detail below. The ICCID/SIMID field is also searched if a matching IMSI is not found 312 in the list of registrations, as will be described in more detail below. If the ICCID/SIMID field is not populated 313, or a matching ICCID/SIMID is not found 342 as described below, another field or property is searched in the registrations. According to an embodiment, if the MSISDN (Mobile Station international ISDN number) field is populated as indicated by 343, then the searching process comprises searching the MSISDN field in the list of registrations as indicated by 370 and as described in more detail below.

According to one embodiment, the mechanism for handling a faulty registration is implemented in the provisioning system 218. In particular, the faulty registration mechanism comprises a firmware/software component for logging a faulty registration, a component for performing a subscriber lookup using another identifier, property, parameter or field, and a component for creating a new "dummy" or fake subscriber, as will be described in more detail below.

Referring to FIG. 3, if the IMSI (International Mobile Subscriber Identity) field is populated in the registration 308, the searching process comprises searching the list of registrations for the IMSI as indicated by 310. If no registrations or records are found with an IMSI matching the IMSI in the faulty registration, then another field or property is searched, for example, the ICCID field. In this embodiment the ICCID (Integrated Circuit Card Identifier) and the SIMID (Subscriber Identity Module Identifier) are treated as one field or property and are searched as described in more detail below. If registration(s) with a matching IMSI are located, then a check is made in 314 to determine if the number of registrations or records located exceed a search limit. The search limit caps or limits the number of registrations (i.e. records) processed so as not to impact system performance. If the number of registrations found with a matching IMSI exceeds the search limit, then a new fake or dummy registration is created without billing in 315. According to an embodiment, the new dummy registration does not include billing, which allows service to continue for the customer associated with the faulty registration without billing charges necessarily accruing as a result of a faulty registration. As will be described in more detail below, the new registration created in 315 may have one or more restrictions associated with it or the corresponding subscriber. The process 300 creates a record/log for the faulty registration information as indicated by 334. The record/log is maintained for further investigation. Provisioning, i.e. operation of the provisioning system 218 (FIG. 2) continues as indicated by 302.

If the number of registrations with a matching IMSI does not exceed the search limit (as determined in 314), then the process 300 loops through the returned registrations to determine a best match registration as indicated by 316. According to this embodiment, if the ICCID/SIMID field is populated in the faulty registration as indicated by 318, then finding a best match in 316 comprises searching the ICCID/SIMID fields in the returned registrations 320 and finding a registration with an identical ICCID/SIMID as indicated by 322. If a match between the ICCID/SIMID fields is not found in 322, then a new registration is created in 315 on the basis that there isn't sufficient certainty in matching only one field or property, e.g., the IMSI field. If a match is found in 322, the next step in 323 comprises checking if the registration with the matching ICCID/SIMID is better than the previous matching registration. According to this embodiment, a check is made in 324 to determine if the status of the matching registration (i.e. record) is more active than the previous matching registration or record. If yes, then the previous best match registration is replaced by the current best match registration in 326, and processing proceeds to 328 as described in more detail below. If not, then a check is made in 325 to determine if the status of the current matching registration is the same as the status of the previous matching registration. If the statuses are the same in 325, then the process is repeated in 323 to find a better match. If not the same in 325, then a further check is made in 327 to determine if the current matching registration was updated more recently than the previous matching registration. If not, then step 323 is repeated. If yes, then the previous best match registration is replaced by the current best match registration in 326, and processing proceeds to 328, which indicates completion of the loop. If a suitable matching registration or record was not found in 330, then a new fake or dummy registration is created in 315 as described above. If a suitable matching registration has been determined in 330, then the provisioning system 218 (FIG. 2) uses the Billing ID (BID) of the existing SIM, as indicated by 332, and continues processing the registration for the existing subscriber with the SIM, i.e. as if the billing identifier field in the registration was populated. The process 300 creates a record/log for the faulty registration information as indicated by 334. The record/log is maintained for further investigation, and provisioning continues 302.

If a matching IMSI property is not found in the registrations for the existing subscribers 312, then a check is made to determine if the ICCID/SIMID field is populated as indicated by 313. If not, then according to this embodiment a further check is made in 343 to determine if the MSISDN field is populated as described in more detail below. If the ICCID/SIMID field is populated in the faulty registration, then the list of registrations in the provisioning system 218 (FIG. 2) is searched for registrations having a matching ICCID/SIMID as indicated by 340. If no registration(s) with a matching ICCID/SIMID are found in 342, then the MSISDN field is checked in 343 and searched in 370, as described in more detail below. It is to be appreciated that according to other embodiments less or more than three of the identifiers or other identifiers or properties may be searched. If registration(s) with a matching ICCID/SIMID are located in 342, then a check is made in 344 to determine if the number of registrations located exceed a search limit. If the number of registrations found with a matching ICCID/SIMID exceeds the search limit, then a new fake or dummy registration is created without billing in 315 as described above.

If the number of registrations with a matching ICCID/SIMID does not exceed the search limit (as determined in 344), then the process 300 loops through the returned registrations to determine a best match registration as indicated by 346. According to this embodiment, if the IMSI field is populated in the faulty registration 348 and the IMSI field is populated in the returned registrations 350, then a check is made to determine if both IMSI values are identical 352. If yes, then the process 300 comprises determining if the registration with the matching IMSI is better than the previous matching registration in 323 as described above. If not the same in 352, then a new dummy registration is created in 315 as described above.

If a matching ICCID/SIMID property is not found in the registrations for the existing subscribers in 342, then a check is made to determine if the MSISDN field is populated as indicated by 343. If not, then according to this embodiment a new fake or dummy registration is created in 315 as described above. If the MSISDN field is populated, then the list of registrations in the provisioning system 218 (FIG. 2) is searched for registrations having a matching MSISDN as indicated by 370. If no registration(s) with a matching MSISDN are found in 372, then a new fake or dummy registration is created in 315 as described above. If registration(s) with a matching MSISDN are located 372, then a check is made in 374 to determine if the number of registrations or records located exceed a search limit. If the number of registrations found with a matching MSISDN exceeds the search limit, then a new fake or dummy registration is created without billing in 315 as described above.

If the number of registrations with a matching MSISDN does not exceed the search limit (as determined in 374), then the process 300 loops through the returned registrations to determine a best match registration as indicated by 376. According to this embodiment, if the IMSI field is populated in the faulty registration 378 and the IMSI field is populated in the returned registrations or records 380, then a check is made to determine if both IMSI values are identical 382. If not the same in 382, then a new fake or dummy registration is created in 315 as described above. If the values are the same or identical in 382, then according to this embodiment, if the ICCID field is populated in the faulty registration 384 and the ICCID field is populated in the returned registrations 386, then a further check is made to determine if both ICCID values are identical in 388. If yes, then the process 300 comprises determining if the registration with the matching ICCID is better than the previous matching registration in 323 as described above. If the ICCID fields are not identical, then a new fake or dummy registration is created without billing in 315 as described above.

Referring still to FIG. 3, if the faulty registration does not have an IMSI property, e.g. the IMSI field is not populated in 378, or the registration or record does not have an IMSI in 380, then according to an embodiment, the process 300 uses the ICCID field or property for further searching and matching as described above for 384, 386 and 388.

As described above with reference to FIG. 3, a search limit is established/checked in 314, 344, 374. The search limit may be implemented as a configurable system parameter in the provisioning system 218 (FIG. 2) and specifies a limit for processing existing records that have an identical field or property, for example, the IMSI, ICCID/SIMID or MSISDN fields. According to an embodiment, if the search returns more records than the allowed limit, then the faulty registration is treated as a new subscriber (e.g. in block 315) for example as described above. According to this aspect, the provisioning system 218 (FIG. 2) treats the faulty registration request as if it is a first time registration (i.e. a new customer from a carrier or service provider partner), and assigns the registration another SIM identifier, which acts as the billing identifier or BID. According to this embodiment, the provisioning system 218 processes the registration according to the policy associated with the customer, i.e. as a regular registration, subject to the following two exceptions.

(1) if the policy requires the activation of services, the provisioning system 218 does not create a billing contract; and (2) the provisioning system assigns a special active status for the active SIM and its active services, or a special de-active status for the de-active SIM and its de-activated services. It is to be appreciated that these two special statuses are only assigned to those subscribers created with fake (i.e. dummy) or false billing identifiers. This special state is provided to control any future interactions with subscribers having the fake or false billing identifiers.

According to one embodiment, future interaction with the new fake or false subscriber may be completed restricted.

If a match is found with a registration for an existing subscriber, as indicated by 330 in FIG. 3, then the provisioning system 218 (FIG. 2) uses the billing identifier of the existing SIM. The provisioning system 218 continues processing (as indicated by 302 in FIG. 3) the faulty registration based on the matched existing subscriber as if the billing identifier (BID) had been populated. However, as indicated by 334 the faulty registration is logged or otherwise recorded/monitored and/or a record/log is created in the provisioning system 218 for further investigation. According to another embodiment or aspect, a record is created and stored in the provisioning system 218 for each received faulty registration, i.e. a registration with missing billing identifier (BID) information.

As described above, a search limit is provided to limit the number of records searched in order to locate an existing subscriber for the faulty registration. When the search limit is reached, a false or fake subscriber is created with a new registration. This means that a real customer associated with the faulty registration can assume a false or fake registration and the real registration for the subscriber will not be used, even though it exists in the provisioning system 218. According to another aspect, the search limit may be increased periodically to increase the "hit" probability.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for provisioning a subscriber in a provisioning system for a mobile communications device, wherein a registration is associated with the subscriber and the registration comprises a plurality of fields and one of the fields includes an identification field, the method comprising the steps of:

determining if identification information in the identification field is faulty;
if said identification information is faulty, selecting another field from the plurality of fields;
assigning said selected field with other identification information associated with the subscriber;
searching a list of existing subscriber registrations for subscriber identification information matching said other identification information;
if said other identification information matches the subscriber identification information for an existing subscriber registration, associating the faulty identification information for the subscriber with the existing subscriber registration; and
if said other identification information does not match the subscriber identification information for the existing subscriber registration, creating a modified registration associated with the subscriber aid said modified registration including one or more restrictions.

2. The method as claimed in claim 1, wherein said modified registration comprises associating the faulty identification information for the subscriber with a false billing identifier, and said one or more restrictions comprises a special active status to the subscriber, wherein the special active status is only assigned to subscribers with false billing identifiers.

3. The method as claimed in claim 2, further including the step of logging activity associated with the faulty identification information for use in billing the subscriber if missing identification information identifying the subscriber is later determined.

4. The method as claimed in claim 1, further including the step of creating a record associated with the faulty identification information.

5. The method as claimed in claim 2, wherein said step of associating the faulty identification information for the subscriber with a false billing identifier comprises selecting another field from said plurality of fields, and searching a list of existing subscriber registrations for subscriber identification information matching identification information associated with said selected another field.

6. The method claimed in claim 1, wherein said identification field comprises an attribute in a subscriber identity module or SIM associated with the subscriber.

7. The Method as claimed in claim 6, wherein the SIM attribute comprises a billing identifier field or BID and said information comprises billing identification information missing from said BID field.

8. The method as claimed in claim 6, wherein said selected field comprises an International Mobile Subscriber Identity field in said SIM.

9. The method as claimed in claim 5, wherein said step of searching a list of existing subscriber registrations is repeated for three or more selected fields or until a search limit is exceeded.

10. A computer program product stored on tangible machine readable medium comprising computer executable instructions:
determining if identification information in an identification field in a registration is faulty;
if said identification information is faulty, selecting another field from a plurality of fields;
assigning said selected field with other identification information associated with a subscriber;
searching a list of existing subscriber registrations for subscriber identification information matching said other identification information;
if said other identification information matches the subscriber identification information for an existing subscriber registration, associating the faulty identification information for the subscriber with the existing subscriber registration; and
if said other identification information does not match the subscriber identification for the existing subscriber registration, creating a modified registration associated with the subscriber and said modified registration including one or more restrictions.

11. The computer program product as claimed in claim 10, wherein said modified registration comprises associating the faulty identification information for the subscriber with a false billing identifier, and said one or more restrictions comprise a special active status to the subscriber, wherein the special active status is only assigned to subscribers with false billing identifiers.

12. The computer program product as claimed in claim 11, further including computer-executable instructions for logging activity associated with the faulty identification information for use in billing the subscriber if missing identification information identifying the subscriber is later determined.

13. The computer program product as claimed in claim 10, further including computer-executable instructions for creating a record associated with the faulty identification information.

14. The computer program product as claimed in claim 10, wherein said computer-executable instructions for associating the faulty identification information for the subscriber with a false billing identifier comprises selecting another field from said plurality of fields, and searching a list of existing subscriber registrations for subscriber identification information matching identification information associated with said selected another field.

15. In a communications network, a system for provisioning a subscriber in a provisioning system wherein a registration is associated with the subscriber and the registration comprises a plurality of fields and one of the fields includes an identification field, the system comprising:
means for determining if information in the identification field in the registration is faulty;
means for selecting another field from the plurality of fields if said identification information is faulty;
means for assigning said selected field with other identification information associated with the Subscriber;
means for searching a list of existing subscriber registrations for subscriber identification information matching said other identification information;
means for associating the faulty identification information for the subscriber with the existing subscriber registration if said other identification information matches the subscriber identification information for an existing subscriber registration; and
means for creating a modified registration associated with the subscriber and said modified registration including one or more restrictions if said other identification information does not match the subscriber identification information for the existing subscriber registration.

16. The system as claimed in claim 15, wherein said modified registration comprises associating the faulty identification information for the subscriber with a false billing identifier, and said restriction comprises a special active status to the subscriber, wherein the special active status is only assigned to subscribers with false billing identifiers.

17. The system as claimed in claim 16, further including means for logging activity associated with the faulty identification information for use in billing the subscriber if missing identification information identifying the subscriber is later determined.

18. The system as claimed in claim 15, wherein said identification field comprises an attribute in a subscriber identity module or SIM associated with the subscriber.

19. The stem as claimed in claim 18, wherein the SIM attribute comprises a billing identifier field or BID and said information comprises billing identification information missing said BID field.

20. The system as claimed in claim 15, wherein said means for searching a list of existing subscriber registrations is configured for searching for three or more selected fields or until a search limit is exceeded.

* * * * *